Sept. 18, 1956 A. B. SKROMME 2,763,306
ATTACHMENT MEANS FOR FORAGE HARVESTER CUTTERS
Filed March 2, 1954
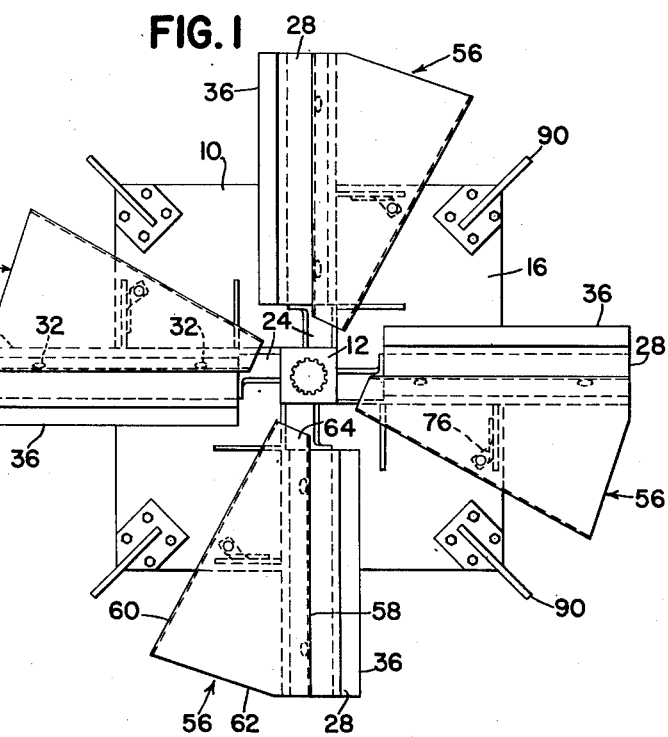
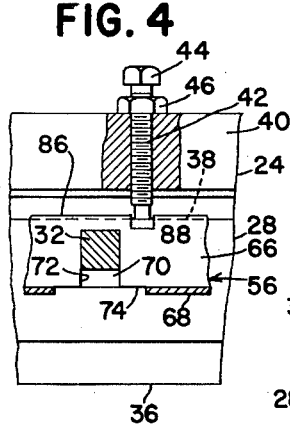
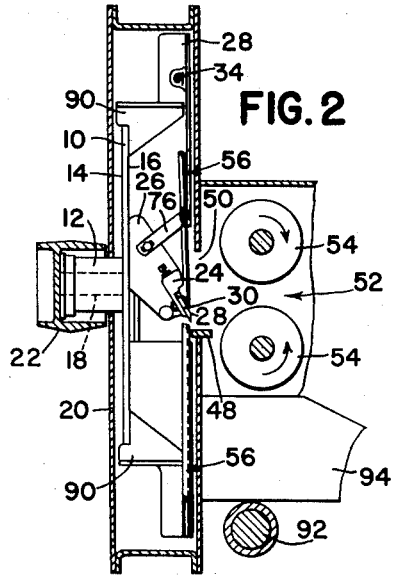
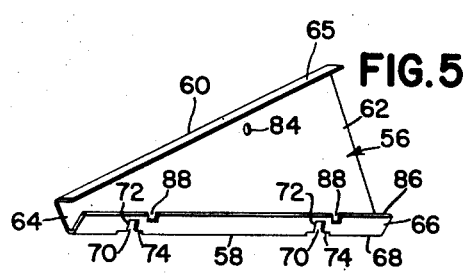
INVENTOR.
A. B. SKROMME
ATTORNEYS

United States Patent Office 2,763,306
Patented Sept. 18, 1956

2,763,306

ATTACHMENT MEANS FOR FORAGE HARVESTER CUTTERS

Arnold B. Skromme, Ottumwa, Iowa, assignor to Deere Manufacturing Co., Dubuque, Iowa, a corporation of Iowa Application March 2, 1954, Serial No. 413,651

10 Claims. (Cl. 146—108)

This invention relates to a rotary cutter, and particularly to an attachment for a rotary cutter as used in machines known as forage harvesters.

In a machine of the general class noted above, often called an ensilage cutter or an ensilage harvester, crops are fed by a horizontal conveyor to a cutter mounted for rotation on a horizontal axis parallel to the line of feeding. The cutter carries a plurality of radially arranged knives cooperative with a stationary cutter bar at about the level of the conveyor, so that as the crops move across the stationary cutter bar and into the path of the knives, the crops are cut or otherwise reduced. On the basis of long experience with machines of this type, it has been determined that the longer lengths of cut are more desirable than the shorter lengths. To this end, cutters or rotors have been generally improved so that the cutting planes through which the knives travel is spaced axially from the supporting structure for the knives, thus enabling the crops to move a greater distance into the cutter housing before being cut by the knives. Representative patents disclosing structure of the nature just outlined are Hill 2,510,633, Tuft 2,457,951 and Hill 2,313,872.

The rotary cutter design based on these patents, and particularly that based on Hill 2,510,633, has found great commercial favor but, as in many cases in which substantial perfection is achieved, there arises a condition now and then in which the design presents drawbacks. One such condition in the case of the cutter referred to occurs in the reducing of crops that are predominantly corn ears or cobs, as in corn silage. In this circumstance, the substantially large angular spaces between the radially arranged knives permits the cobs and ears to flow in and thus to escape reduction by the knives. Although, as stated above, longer cuts in most crops are preferred to shorter cuts, it is also desirable to reduce the cobs, since the original lengths thereof are too great for silage.

According to the present invention, all the advantages of the basic design are retained but the disadvantages peculiar to corn ensilage and like material are eliminated by the provision of removable shield means or filler elements adapted to be mounted on the rotor in such manner as to respectively at least partially fill the angular spaces between the knives. It is an important object of the invention to provide these shield means as attachments constituting a set, there being as many shields or elements as there are knives, and each being attached to or near to a knife to extend from the knife in a trailing direction but terminating short of the next adjacent trailing knife. The invention features the provision of the shield or element in the form of a plate-like structure in which the plate, when mounted, is disposed axially inwardly of the cutting plane so as not to interfere with the cutting action of the rotor, and preferably at a slight inward angle to the cutting plane. Further objects of the invention reside in the novel mounting means, the provision for accommodation of adjusting structure on the rotor, and a design in which attachment and removal of the shield means is a simple matter.

The foregoing and other important objects and desirable features inherent in and encompassed by the invention will become apparent as a preferred embodiment of the invention is described in detail in the following specification and as illustrated in the accompanying sheet of drawings, the several figures of which will be described immediately below.

Fig. 1 is a face view of the rotor, from its cutting side, showing the mounting of the shield elements.

Fig. 2 is a fragmentary longitudinal sectional view, on a reduced scale, showing the relationship between the rotor, its housing and part of the feed means for delivering material to the rotor.

Fig. 3 is an enlarged elevational view showing the mounting of a shield or filler element on the associated knife and knife support.

Fig. 4 is an enlarged sectional view as seen along the line 4—4 of Fig. 3.

Fig. 5 is a perspective view from the back side of the shield or filler element.

The rotor, best shown by itself in Fig. 1, comprises a rotary member or rotor plate 10 having hub means 12 and opposite radial faces 14 and 16, the former being a back face and the latter a front face. Reference hereinafter to the rotor face will be to the face 16.

The hub 12 enables journaling of the rotor plate 10 on a fixed shaft 18 in a rotor housing 20. The housing is of generally conventional construction. An input pulley 22 is bolted to the hub 12 so that the rotor may be belt-driven. These details are merely representative of other forms that the design could take.

The rotor structure is generally like that in Hill 2,510,633 and has a plurality of uniformly angularly spaced elongated arms 24 arranged in generally radiating fashion as respects the axis of the hub means 12. These arms are disposed in uniform axially spaced relation to the front of the front rotor face 16 and each arm is mounted on the rotor by support means 26, which means may take any suitable form, here being shown as a casting integral with the associated arm 24.

Each arm carries thereon an elongated cutting knife 28, the arm 24 having an inclined mounting surface 30 against which the rear side of the knife abuts. The knife is mounted on the associated arm 24 by a pair of releasable and re-securable members or fasteners such as carriage bolts 32 having nuts 34. As best shown in Fig. 3, the arm 24 is slotted at 35 to receive shanks 31 of the associated bolts 32 and to allow a limited amount of adjustment of the bolt relative to the arm when the nuts 34 are loosened. The knife 28 is apertured in two places, as indicated at 29 in Fig. 3, to receive the shanks 31 of the associated bolts 32, the bolts having heads 33 facing forwardly.

Each knife has a leading cutting edge 36 and a trailing back or non-cutting edge 38. As seen in Fig. 3, the arm 24 includes an upper portion 40 that overhangs forwardly of the back edge 38 of the associated knife. This portion 40 is drilled and tapped, as at 42, to receive threaded adjusting means in the form of a screw 44 retained in adjusted position by a lock nut 46. There are two adjusting means, but only one appears in the drawings. The presence of the other is believed to be obvious, particularly with reference to the patents mentioned above.

The knives 28 are mounted on their respective arms 24 and are adjusted by means of the releasable and re-securable members 32 and the adjusting means 44 so that the cutting edges 36 lie in a cutting plane normal to the axis of the hub means 12 and axially offset from the rotor face 16. When the rotor rotates, the cutting edges 36 of the knives cooperate in succession with a fixed cutter bar 48 carried at the lower edge of a feed opening 50 in a front wall of the rotor housing 20. Material is conveyed in the direction of the arrow 52 and is fed between a pair of feed rolls 54, which rotate as indicated, through the feed opening 50 and into the path of the knives 28. Because of the axial offset between the cutting plane and the rotor face 16, material fed by the feed rolls 54 may move a substantial distance into the housing before being obstructed by the rotor face 16, whereupon the length of cut is increased. The speed of the speed rolls 54 can, of course, be regulated so as to vary the length of the cut, all as pointed out particulary in the above-noted patent to Hill. From this, it will be seen that in the case of corn silage, ears and cobs, because of their relative rigidity, may easily move into the space between the knives and the rotor face 16 and thus avoid reduction. As pointed out above, this disadvantage is eliminated according to the present invention by the provision of a plurality of shields or filler elements, each of which is designated generally by the numeral 56, there being as many elements as there are angular spaces between the neighboring pairs of knives 28. The angular space between a knife 28 and its next adjacent trailing knife occurs between the trailing edge 38 of one knife and the cutting edge 36 of the next adjacent knife. Because of the substantial angular space, combined with the axial spacing between the cutting plane and the rotor face 16, ears and cobs and other short rigid material may easily enter the rotor housing without reduction by the knives. As will be generally apparent in Figs. 1 and 2, the filler elements respectively occupy parts of these angular spaces, and thus form obstructions to the inward movement of the fed material, thereby reducing the angular space ahead of the cutting edge of each knife and consequently affording that knife a better opportunity to reduce that material. Each filler element lies generally in the cutting plane but preferably at a slight angle (on the order of 8°) thereto as shown by the line A—A in Fig. 3.

Each element 56 is of plate-like structure having a generally triangular shape formed by a pair of long edges 58 and 60, a short edge 62 and an apex portion 64. The one long edge 60 has an angularly related flange 65 thereon to afford rigidity. The other edge 58 serves as a mounting edge and has thereon an angularly related flange 66, which adjoins the general body part of the element 56 along a bend line or junction 68. The element 56 is mounted on its associated knife and related arm by means of the flange 66, which flange has therein means cooperative with the releasable and resecurable elements 32. Specifically, each of the mounting means comprises an aperture in the form of a keyhole slot 70 and each slot has a narrow portion 72 and a wide portion 74. Part of the wide portion extends into the body part of the element in the vicinity of the bend line or junction 68. Therefore, it is a relatively easy matter to mount the element on the knife, all that is required being the temporary loosening of the elements 32—34 so that the wide portions of the keyhole slots 70 will receive the headed ends 33 of the bolts 32. The element is then slipped in a downward direction until the narrow portion 72 of the slot receives the shank of the bolt 32, after which the nuts 34 are tightened.

Additional mounting means is provided on each element in the form of a brace 76 rigidly secured at 78 to the element and projecting rearwardly from the rear face thereof. Each brace is apertured at 80 at its rear or inner end to receive securing means in the form of a bolt 82 by means of which the brace is rigidly attached to the associated support 26. The numeral 84 in Fig. 5 designates the opening by means of which the brace 76 is riveted or otherwise secured to the element 56 at the point 78 previously described.

As each knife 28 wears and is sharpened, its cutting edge 36 must be relocated relative to the cutting plane. This is accomplished by adjusting the knife outwardly and toward the radial plane by means of the releasable and re-securable elements 32—34 and the slots 35 in the knife-carrying arm 24, the lock nuts 46 on the screws 44 being released so that the screws may be tightened to propel the knife in the necessary direction. After proper adjustment is obtained, the nuts 34 and 46 are tightened and the knife is secured. In order to accommodate the adjusting screws 44, the mounting flange 66 on each element 56 itself has a terminal edge 86 relieved or provided with a pair of notches 88, the purpose of which will be clear from Fig. 4.

In conditions in which it is undesirable to use the shield elements 56, they may be readily removed by reversing the attaching process previously described.

In Fig. 1, the numeral 90 represents paddles conventionally carried on the rotor. In Fig. 2, the numeral 92 represents the axle of the machine on which the rotor housing 20 is carried by means of supporting framework 94. A detailed comprehension of the parts 90, 92 and 94 is not necessary to an understanding of the present invention.

The rotor shown here has been described with respect to the radiating arms 24. It will be understood, however, that the arms may be arranged so that they do not lie exactly on radii from the hub 12, as in the above-noted Tuft patent. These variations are, of course, immaterial to the accomplishment of the objects of the invention. Various other modifications and alterations in the preferred embodiment of the invention disclosed herein, as well as the accomplishment of specific objects and features not specifically enumerated, will undoubtedly occur to those versed in the art, without departing from the spirit and scope of the invention.

What is claimed is:

1. A cutter rotor, comprising: a rotor plate having hub means and a face disposed radially to the axis of said hub means; a plurality of elongated arms uniformly angularly spaced about and generally radiating from the hub means in uniformly axially offset relation to said rotor face, each arm having a free, outer terminal end; a plurality of support means, one for each arm, mounting the arms on the rotor face; a plurality of knives, one mounted on and lying along each arm and having a leading cutting edge effective in a radial cutting plane offset axially beyond the arms and each knife being inclined axially toward its arm and in a trailing direction and having a trailing edge thereof offset axially from said cutting plane; a plurality of removable shield means, one for each knife and its associated arm, each shield means comprising a plate-like element of generally triangular shape having a pair of long edges, a short edge and an apex portion; each element being arranged with its apex portion toward the hub means, one long edge lying along the associated knife substantially in the cutting plane, its short edge extending generally circumferentially in a trailing direction at the free terminal end of the associated knife and terminating short of the next adjacent trailing knife, and its other long edge running radially inwardly to said apex portion in angularly spaced relation to the cutting edge of said next adjacent trailing knife, the plane of said element being inclined inwardly and in a trailing direction from the cutting plane so that said other long edge of said element is axially offset from the cutting plane in the direction toward the rotor face; and a plurality of individual means removably mounting the elements respectively on the rotor.

2. The invention defined in claim 1, in which: each knife is mounted on its arm by releasable and re-securable members; and the individual mounting means for each element includes portions on said one long edge of the element cooperative with the associated releasable and re-securable members.

3. The invention defined in claim 2, in which: each releasable and re-securable member has a headed end facing toward the cutting plane; and each of said cooperative portions on each element includes a keyhole slot receiving the headed end of the respective member.

4. The invention defined in claim 1, in which: the individual means on each element comprises portions on the one long edge of the element securable to the knife and brace means on each element spaced angularly from said securable portions in a trailing direction and removably secured to the support means for the associated arm.

5. The invention defined in claim 1, in which: each knife is adjustably mounted on its arm for movement toward and away from the cutting plane by adjusting means carried by said arm and cooperative with the trailing edge of said knife; each element has at said one long edge thereof a marginal flange overlying the knife; and said flange has notch means therein to accommodate the associated adjusting means.

6. A cutter rotor, comprising: a rotor plate having hub means and a face disposed radially to the axis of said hub means; a plurality of elongated knives uniformly angularly spaced about and generally radiating from the hub means and mounted on said rotor face, each knife having a free, radially outermost terminal end, a cutting edge operative in a radial cutting plane axially offset from said rotor face and a trailing edge offset axially from said plane toward said rotor face; a plurality of removable shield means, one for each knife and its associated arm, each shield means comprising a plate-like element of generally triangular shape having a pair of long edges, a short edge and an apex portion; each element being arranged with its apex portion toward the hub means, one long edge lying along the associated knife substantially in the cutting plane, its short edge extending generally circumferentially in a trailing direction and terminating short of the next adjacent trailing knife, and its other long edge running radially inwardly to said apex portion in angularly spaced relation to the cutting edge of said next adjacent trailing knife, the plane of said element being inclined inwardly and in a trailing direction from the cutting plane so that said other long edge of said element is axially offset from the cutting plane in the direction toward the rotor face; and a plurality of individual means removably mounting the elements respectively on the rotor.

7. A cutter rotor, comprising: a rotor plate having hub means and a face disposed radially to the axis of said hub means; a plurality of elongated knives uniformly angularly spaced about and generally radiating from the hub means and mounted on said rotor face, each knife having a free, radially outermost terminal end, a cutting edge operative in a radial cutting plane axially offset from said rotor face and a trailing edge offset axially from said plane toward said rotor face; a plurality of removable shield means, one for each knife, each shield means comprising a plate-like element having a mounting edge lying along the respective knife between the leading and trailing edges of said knife and with the general area of the plate occupying at least part of the angular space between said knife and the cutting edge of the next adjacent trailing knife, the plane of the element being axially offset from the cutting plane in the direction toward the rotor face; and a plurality of individual means removably mounting the elements respectively on the rotor.

8. An attachment shield for mounting on a radial knife of a cutter rotor in which the knife has a leading cutting edge operative in a cutting plane normal to the rotor axis and wherein the knife is mounted on the rotor by releasable securing means including fasteners having shanks through the knife and heads facing toward the cutting plane, said shield comprising: a plate-like element including a body part of generally triangular shape having front and rear faces, an apex portion, a pair of long edges diverging from the apex portion and a short edge connecting the long edges, said body part including a marginal mounting flange along and having an integral junction with one of said long edges, said flange being directed rearwardly and in the direction of the other long edge and having apertures therein to receive the shanks of the knife-mounting fasteners for mounting the shield on the knife with the body part of the shield trailing the knife and with the front face of said body part adjacent to the cutting plane.

9. The invention defined in claim 8, in which: each aperture is in the form of a keyhole slot opening forwardly at the junction of the flange and body part and having a relatively narrow shank-receiving portion in the flange and a relatively wider head-accommodating portion in the body part affording a slip-on, slip-off relationship between the shield and the fasteners.

10. An attachment shield for mounting on a radial knife of a cutter rotor in which the knife has a leading cutting edge operative in a cutting plane normal to the rotor axis and wherein the knife is mounted on the rotor by releasable securing means including fasteners having shanks through the knife and heads facing toward the cutting plane, and wherein adjusting screws on the rotor engage the trailing edge of the knife, said shield comprising: a plate-like element including a body part of generally triangular shape having front and rear faces, an apex portion, a pair of long edges diverging from the apex portion, a short edge connecting the long edges, said body part including a marginal mounting flange along and having an integral junction with one of said long edges, said flange being directed rearwardly and in the direction of the other long edge and having apertures therein to receive the shanks of the knife-mounting fasteners for mounting the shield on the knife with the body part of the shield trailing the knife and with the front face of said body part adjacent to the cutting plane, and said flange having notches therein to accommodate the adjusting screws.

References Cited in the file of this patent

UNITED STATES PATENTS

| | | |
|---|---|---|
| 773,483 | Drew | Oct. 25, 1904 |
| 2,004,753 | Gredell | June 11, 1935 |
| 2,312,612 | Wetmore | Mar. 2, 1943 |